Patented Mar. 11, 1941

2,234,933

UNITED STATES PATENT OFFICE 2,234,933

LEVO-1-PHENYL-2-METHYL-ETHYLAMINO PROPANOL-1 AND ACID ADDITION SALTS THEREOF AND PROCESS FOR MAKING THEM

Robert S. Shelton, Mariemont, Ohio, assignor to The Wm. S. Merrell Company, Reading, Ohio, a corporation of Delaware No Drawing. Application December 2, 1938, Serial No. 243,543

7 Claims. (Cl. 260—572)

This invention relates to the N-ethyl derivative of levo 1-phenyl 2-methylamino propan-1-ol, and includes this new product and an advantageous method of preparing it and other products.

The levo-rotatory compound l-ephedrine, is an extremely valuable therapeutic agent widely used for the treatment of asthma, hay fever, etc., and as vaso-constricting agents for the treatment of colds and the like. The most commonly used product is natural l-ephedrine, which is commonly obtained from the plant MaHuang, although it is also prepared synthetically. Synthetic 1-phenyl 2-methylamino propan-1-ol is produced as a racemic mixture of ephedrine-dl and pseudo-ephedrine-dl. This racemic mixture has properties and uses similar to those of l-ephedrine, but has a much lower activity than l-ephedrine. It may be resolved into the levo- and dextro-fractions; and the levo-ephedrine separated which is quite comparable with the naturally occurring alkaloid. L-pseudo-ephedrine and d-pseudo-ephedrine, which are other stereoisomeric forms of 1-phenyl 2-methylamino propan-1-ol are also available as alkaloids having more or less similar properties. The use of 1-phenyl 2-methylamino propan-1-ol, for example, by internal administration for relief in asthma, is subject to certain disadvantages because of side effects, as in many cases it causes sleeplessness, nausea, albuminurea, palpitations of the heart, etc.

The new 1-phenyl 2-methylamino propan-1-ol derivatives of the present invention have some of the same therapeutic properties as the products referred to above, e. g. for the treatment of asthma, etc., but have a greatly reduced tendency to cause side effects, including circulatory and general systemic disturbances.

The new derivative of the present invention is the levo 1-phenyl 2-methylethylamino propan-1-ol ($C_6H_5CHOHCH(CH_3NC_2H_5)CH_3$). The product is a tertiary amine, obtained by replacing the nitrogen-linked hydrogen of levo 1-phenyl 2-methylamino propan-1-ol by an ethyl group, advantageously by reaction with diethyl sulfate.

The new product may be prepared in the form of the free base, or in the form of acid addition salts, such as the hydrochlorides, the sulfates, the phosphates, the picrates, the oleates or other fatty acid salts, etc. For internal administration, as in the treatment of asthma or the like, the salts, particularly the hydrochloride, sulfate or phosphate, are used.

In preparing the new derivative of the invention, levo 1-phenyl 2-methylamino propan-1-ol, is ethylated with a suitable ethylating agent, advantageously diethyl sulfate, with the direct production of the corresponding ethyl salt. The ethyl group is introduced on the nitrogen atom, rather than on the hydroxyl group, with the production of the tertiary amine. The salt obtained is readily converted to the free base by suitable treatment with alkali, and any of the acid addition salts are readily prepared from the free base by simple neutralization. The new product may also be prepared with the use of other ethylating agents, such as ethyl iodide or ethyl bromide. N-ethyl derivatives of the other (stereo or geometrical isomers of the levo compound) 1-phenyl 2-methylethyl amino propan-1-ols may be similarly prepared.

The production of the new derivatives will be illustrated by the following example, but it is not limited thereto.

*Example.*—64 parts of l-ephedrine are dissolved in about 60 parts of alcohol. 60 parts of redistilled diethyl sulfate are then slowly added over a period of about three-fourths to one hour, while maintaining the temperature at 40–50° C. After the addition of the ethyl disulfate is complete, the mixture is maintained for about two hours longer at 40–50° C. The solvent is then distilled off at a reduced pressure and the residual viscous oil is shaken with 60 parts of 40% potassium hydroxide solution. The free base is extracted from this mixture by treatment with three successive portions of ether. The ether is evaporated from the combined extract and an aqueous, saturated solution of oxalic acid is added to the resulting thick oil until the mixture is acid to litmus. When the resulting solution is chilled, the unreacted ephedrine separates as an insoluble oxalate, the 1-N-ethyl ephedrine oxalate remaining in solution. This soluble oxalate is then shaken with 30 parts of 40% potassium hydroxide solution and the free base is extracted with ether. The ether solution is dried over sodium sulfate and the ether is removed by evaporation. The levo-1-phenyl 2-methylethylamino propan-1-ol is obtained in excellent yields, while substantially all of the unreacted l-ephedrine is recovered as the insoluble oxalate.

The new levo-1-phenyl 2-methylethylamino propan-1-ol is a white crystalline solid, M. P. 29–30° C. It is relatively soluble in mineral oil, one part dissolving in ten parts of oil to give a clear solution and in six parts of oil to give an opalescent solution. Its specific rotation $$a_D^{20}$$

is −15° in absolute alcohol. It forms a crystalline picrate, M. P. 110–111°; a white crystalline ethiodide, M. P. 165–167° C., specific rotation $$a_D^{20} = -9.75°$$

a crystalline hydrochloride, M. P. 185° C., specific rotation $$a_D^{20} = -21.0°$$

in water; a crystalline phosphate, R.H₃PO₄, M. P. 230° C., specific rotation $$a_D^{20} = -20.8°$$

in water. It readily forms acid addition salts with other acids, including inorganic acids such as sulfuric acid, other halogen and phosphoric acids, etc., and organic acids, including the lower and higher fatty acids, such as acetic, propionic, lauric, oleic, stearic acids, etc., lactic acid, succinic acid, etc.

Pharmacological tests indicate that this compound has substantially the same toxicity as l-ephedrine. Some therapeutic properties, as indicated, for example, by dilation of the bronchioles, are about the same as that of ephedrine. It has important advantages over ephedrine in that, in therapeutic doses, it has a negligible effect upon blood pressures, apparently producing at the most a transient drop in blood pressure lasting several seconds followed by a return to normal pressure, whereas ephedrine produces, in therapeutic dosage, a substantial rise in blood pressure. This rise in blood pressure is one of the most important deleterious effects of l-ephedrine when used as a therapeutic agent, and is indicative of the circulatory and general systemic disturbances caused by l-ephedrine; and one of the important advantages of the new product is that, in therapeutic dosage, it causes no substantial effect on blood pressure.

I claim:
1. The process of preparing 1-phenyl 2-methyl-ethylamino propan-1-ol which comprises reacting 1-phenyl 2-methylamino propan-1-ol with diethyl sulfate and recovering unreacted 1-phenyl 2-methylamino propan-1-ol from the reaction product by precipitation from aqueous solution as the oxalate.
2. Levo-1-phenyl 2-methylethylamino propan-1-ol.
3. Acid addition salts of levo-1-phenyl 2-methylethylamino propan-1-ol.
4. Levo-1-phenyl 2-methylethylamino propan-1-ol hydrochloride.
5. Levo-1-phenyl 2-methylethylamino propan-1-ol phosphate.
6. Compounds of the class consisting of levo-1-phenyl 2-methylethylamino propan-1-ol and its acid addition salts.
7. The process of preparing levo-1-phenyl 2-methylethylamino propan-1-ol which comprises reacting 1-phenyl 2-methylamino propan-1-ol with diethyl sulfate and recovering unreacted levo-1-phenyl 2-methylamino propan-1-ol from the reaction product by precipitation from aqueous solution as the oxalate.

ROBERT S. SHELTON.